(12) United States Patent
Katsube et al.

(10) Patent No.: US 7,689,201 B2
(45) Date of Patent: Mar. 30, 2010

(54) COMMUNICATION TERMINAL EQUIPMENT

(75) Inventors: Yusaku Katsube, Yokohama (JP);
Koichi Terui, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 279 days.

(21) Appl. No.: 11/897,432

(22) Filed: Aug. 29, 2007

(65) Prior Publication Data

US 2008/0003976 A1    Jan. 3, 2008

Related U.S. Application Data

(63) Continuation of application No. 11/059,610, filed on Feb. 15, 2005, now abandoned.

(30) Foreign Application Priority Data

Apr. 5, 2004 (JP) ............................ 2004-110645

(51) Int. Cl.
*H04M 11/04* (2006.01)

(52) U.S. Cl. .................. 455/404.1; 455/412.2; 455/416

(58) Field of Classification Search ......... 455/410–411, 455/404.1, 404.2, 456.1, 466, 412.2, 416
See application file for complete search history.

(56) References Cited

U.S. PATENT DOCUMENTS

| | | | | |
|---|---|---|---|---|
| 4,855,713 | A * | 8/1989 | Brunius | 340/506 |
| 5,907,279 | A * | 5/1999 | Bruins et al. | 340/506 |
| 6,009,325 | A | 12/1999 | Retzer et al. | |
| 6,249,674 | B1 | 6/2001 | Verdonk | |
| 6,411,804 | B1 * | 6/2002 | Isomichi et al. | 455/403 |
| 6,801,780 | B1 * | 10/2004 | Foladare et al. | 455/458 |
| 7,109,879 | B2 * | 9/2006 | Stults et al. | 340/691.1 |
| 2003/0032389 | A1 | 2/2003 | Kim et al. | |
| 2003/0050040 | A1 * | 3/2003 | Yamazaki et al. | 455/404 |
| 2005/0048945 | A1 | 3/2005 | Porter | |
| 2005/0124316 | A1 * | 6/2005 | Islam et al. | 455/404.2 |

(Continued)

FOREIGN PATENT DOCUMENTS

JP    10-042365    2/1998

(Continued)

OTHER PUBLICATIONS

Japan Patent Office (JPO) office action for JPO patent application JP2004-110645 (Dec. 4, 2009).

*Primary Examiner*—George Eng
*Assistant Examiner*—Brandon J Miller
(74) *Attorney, Agent, or Firm*—Townsend and Townsend and Crew LLP

(57) ABSTRACT

A cellular phone having a telephone communication unit and a data communication unit is provided with the function of notifying a user of emergency data communication immediately even when the emergency data communication was received while a call was in progress. There is provided a communication terminal equipment according to the present invention, which includes a data communication unit which receives emergency data communication, a display unit which displays the contents of the received data communication thereon, and a communication unit which communicates with a base station by phone or the like. The communication unit establishes a call link through a cellular phone network, and the data communication unit allows received data to interrupt a call upon emergency, displays it on the display unit and notifies a user that emergency data has been received.

8 Claims, 14 Drawing Sheets

CONCEPTUAL DIAGRAM OF EMERGENCY
COMMUNICATION INTERRUPT SYSTEM

U.S. PATENT DOCUMENTS

| | | | |
|---|---|---|---|
| 2005/0134455 A1* | 6/2005 | Binning | 340/539.18 |
| 2005/0136885 A1* | 6/2005 | Kaltsukis | 455/404.1 |
| 2005/0197096 A1 | 9/2005 | Yang et al. | |
| 2005/0202799 A1* | 9/2005 | Rollender | 455/404.1 |
| 2006/0058005 A1 | 3/2006 | Dolezal et al. | |

FOREIGN PATENT DOCUMENTS

| | | |
|---|---|---|
| JP | 10-164224 | 6/1998 |
| JP | 2001-251678 A | 9/2001 |
| JP | 2001-258070 | 9/2001 |
| JP | 2003-258950 | 9/2003 |

* cited by examiner

SCREEN UNDER EMERGENCY COMMUNICATION
AT THE TIME NORMAL CALL IS ON HOLD

SCREEN UNDER NORMAL CALL IN PROGRESS AT THE TIME EMERGENCY COMMUNICATION IS ON HOLD

FLOWCHART

FLOWCHART FOR DETERMINATION OF EMERGENCY COMMUNICATION

FIG.10

RECEIVED EMERGENCY COMMUNICATION DATA

| | EMERGENCY COMMUNICATION PATTERN | OUTGOING SOURCE OF EMERGENCY COMMUNICATION |
|---|---|---|
| RECEIVED DATA | 100100101 | TV107839 |

FIG.11

EMERGENCY COMMUNICATION PATTERN TABLE

| URGENT CONTENTS | PATTERN |
|---|---|
| USER-REGISTERED DEVICE | 100100100 |
| EMERGENCY BROADCAST | 101100100 |
| EMERGENT MAIL | 110100100 |
| EMERGENT IP PHONE | 111100100 |
| . | . |
| . | . |
| . | . |

FIG.12

USER-REGISTERED DEVICE ID TABLE

| DESIGNATION | ID |
|---|---|
| A-TV | TV107839 |
| B-TV | TV234578 |
| C-VTR | VTR32556 |
| D-FIRE | FIRE425896 |
| E-GUS | GUS456812 |
| F-CUR | CUR25445646 |
| G-HS | HS5646852 |
| . | . |
| . | . |

FIG.13

EMERGENCY BROADCAST ID TABLE

| DESIGNATION | ID |
|---|---|
| QUE | QUE106456 |
| FIRE | FIRE5464648 |
| WAT | WAT454468 |
| ML | ML584864654 |
| . | . |
| . | . |

FIG.14

EMERGENT MAIL ID TABLE

| DESIGNATION | ID |
|---|---|
| aaa@aaa.com | A45464682 |
| bbb@bbb.com | B54648962 |
| ccc@ccc.com | C55646521 |
| . | . |
| . | . |

FIG.15

EMERGENT IP PHONE ID TABLE

| DESIGNATION | ID |
|---|---|
| A | FECD:BA98:765 |
| B | 3210:FEDC:BA9 |
| C | BA98:7654:321 |
| . | . |
| . | . |

CONFIGURATION OF RECEIVED COMMUNICATION DATA FRAME

BLOCK DIAGRAM OF CELLULAR PHONE WITH TV BROADCAST FUNCTION

COMMUNICATION TERMINAL EQUIPMENT

CROSS-REFERENCES TO RELATED APPLICATIONS

This is a continuation of U.S. patent application Ser. No. 11/059,610, filed Feb. 15, 2005, which application claims priority from Japanese Patent Application No. 2004-110645, filed Apr. 5, 2004, and is hereby incorporated by reference for all purposes.

BACKGROUND OF THE INVENTION

The present invention relates to communications devices and more particularly to the handling of urgent situations using a communications device.

As an emergency communication interrupting method employed in a cellular phone capable of data communication, there has been proposed a method of notifying a phone call made from other person by a catch phone or call waiting where interrupt is made between calls of the two (see, for example, Japanese Patent Laid-Open No. 10-164224 (patent document 1)).

As a method of identifying emergency communication, there has been proposed a technique wherein an emergency communication identification signal is provided in control data so that emergency communication can be received even while a voice call is in progress, the emergency communication is notified to a user by a sound or light when the emergency communication is received, and the type of emergency communication is displayed on the screen on the basis of data registered in advance (see, for example, Japanese Patent Laid-Open No. 2001-258070 (patent document 2)).

In the method described in the patent document 1, however, an emergency call is assumed to be interrupted during calling, and an interruption of emergency data communication cannot be made while a call is in progress. Therefore, when emergency information is transmitted by data communication, its reception is delayed and hence the information cannot be obtained promptly.

In the technique described in the patent document 2, it is assumed that emergency communications transmitted to an unspecified number of cellular phones that belong to within the same area are received. It is not possible to handle emergency communication intended for individual. That is, since the technique is based on the premise that emergency communication is embedded in each of communication control data transmitted to an unspecified number of cellular phones that belong to within the same area, it is not possible to transmit emergency communication intended for individual. Since one emergency communication outgoing source and another emergency communication outgoing source are not able to establish communication in a one-to-one form, the emergency communication outgoing source having received emergency communication is not able to effect processing on the corresponding emergency communication outgoing source either. Further, the communication control data intended for the unspecified number of cellular phones belonging to within the same area are used, there is a need to add the capacity of control data for emergency communication to the existing control data.

Thus, the present invention provides a communication terminal equipment which notifies a user of emergency information even if a call thereof is in progress when the emergency information is received, thereby making it possible to improve safety.

BRIEF SUMMARY OF THE INVENTION

The present invention includes a voice transmit-receive unit which performs transmission/reception of voice, a data transmit-receive unit which performs transmission/reception of data, and a notifying unit which notifies that emergency information has been received. When emergency information containing destination information indicating that the destination of the received emergency information is a specific communication terminal equipment inclusive of its own communication terminal equipment is received while a voice call is in progress, the notifying unit notifies that the emergency information has been received. Thus, it is possible to provide a communication terminal equipment capable of improving safety.

BRIEF DESCRIPTION OF THE DRAWINGS

These and other features, objects and advantages of the present invention will become more apparent from the following description when taken in conjunction with the accompanying drawings wherein:

FIG. 10 is a diagram showing received emergency communication data;

FIG. 11 is a diagram depicting an emergency communication pattern table to which an emergency communication identifying unit refers;

FIG. 12 is a diagram showing a user-registered device ID table to which the emergency communication identifying unit refers;

FIG. 13 is a diagram illustrating an emergency broadcast ID table to which the emergency communication identifying unit refers;

FIG. 14 is a diagram depicting an emergent mail ID table to which the emergency communication identifying unit refers;

FIG. 15 is a diagram showing an emergent IP phone ID table to which the emergency communication identifying unit refers;

DETAILED DESCRIPTION OF THE INVENTION

The following embodiment intends to make urgent or emergency data communication a higher priority than a call when the urgent data communication is received while a call is in progress by a cellular phone or during data communication, to, while a call is in progress at present, notify its contents to two persons talking thereabout through a sound, light, vibrations or the like, and to display the contents of the urgent data communication on a display device. Further, the present embodiment aims to allow a user to select whether "a call is on hold" or "the call is broken off", thereby to establish an emergency communication line. Furthermore, the present embodiment intends to, when emergency data communication is inputted during data communication or while a broadcast is being received, notify a user of its contents by means of a sound, light or vibrations and to display the contents of emergency data communication on the display device.

Described more specifically, emergency data communication is transmitted using means such as Internet, a telephone communication network in order to notify a user that trouble occurred in an outgoing source of emergency communication or the like and an emergency situation happened. The user receives the data communication even in any cases such as a call in progress through a cellular phone or on the Internet, during reception of a broadcast, etc. to discriminate whether the data communication indicates the contents of emergency. If it is found to be emergency data communication, then the user is informed that the emergency communication has been received through a sound, vibrations or light, and the contents of the emergency data communication are displayed on the screen. Since the user is able to confirm the contents of the emergency data communication, the user holds the present communication where the user has determined to be such a condition that adaptation to it must be urgently taken, and the outgoing source of emergency communication or the like can be controlled through the emergency communication.

The outline of the present embodiment will hereinafter be described using FIG. 1.

Figure 1:
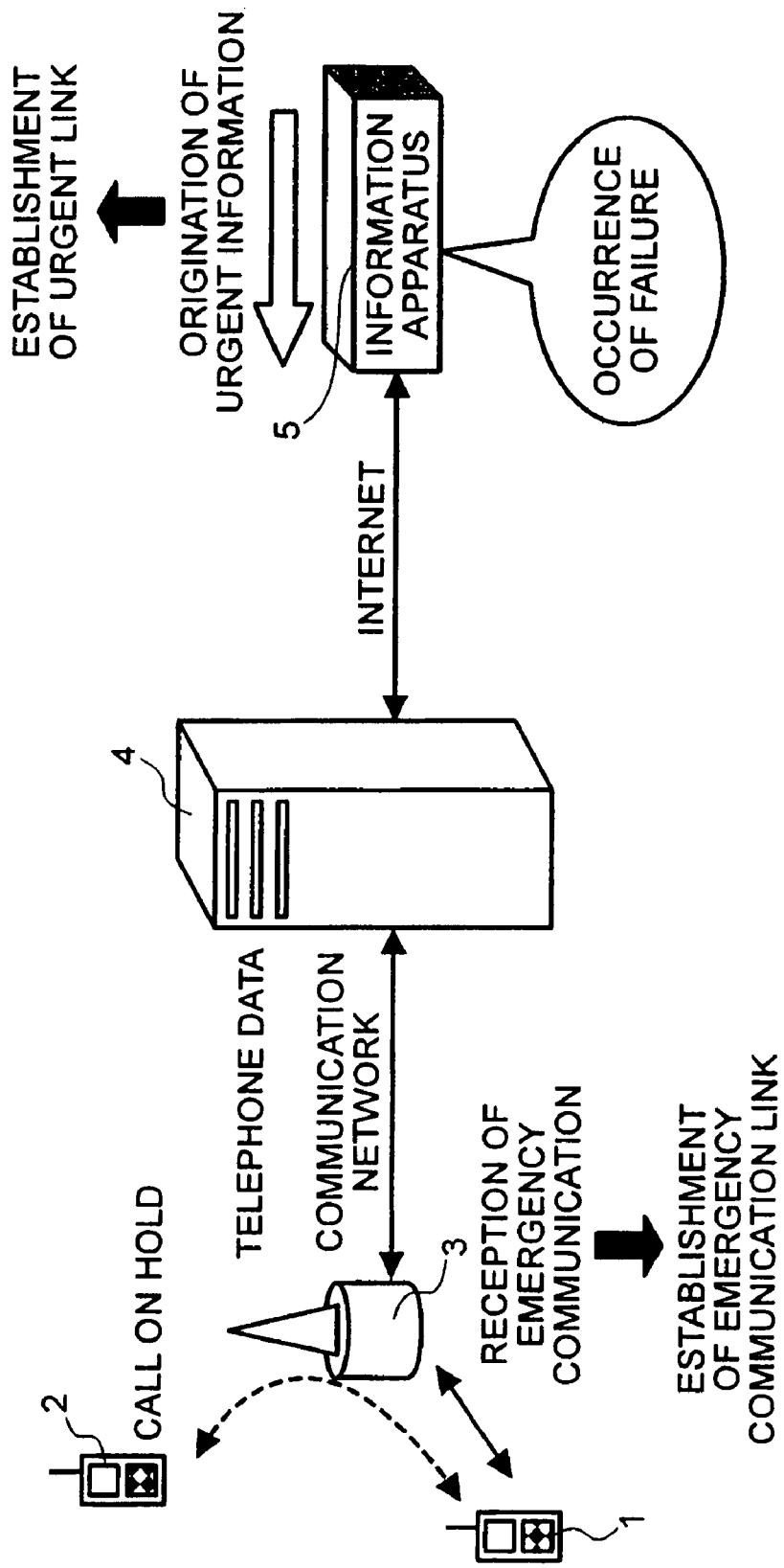
FIG. 1 is a diagram showing the outline of an embodiment according to the present invention.

FIG. 1 is a diagram showing the relationship in which an emergency communication outgoing or transmission source transmits emergency communication (emergency information) to a user while a call is in progress, and the user and the emergency communication outgoing source establish an emergency communication link. A cellular phone 1 is a cellular phone used by a user and is assumed to be in communication with a cellular phone 2. A base station 3 is set so as to make a link of a communication line between the cellular phone 1 and the cellular phone 2. The base station 3 is linked to a telephone network control center 4 through a telephone data communication network. The telephone network control center 4 is configured with being linked to Internet. An emergency communication outgoing source 5 serves as an emergency communication outgoing source if products such as an air conditioner, TV, a personal computer, etc. each having a communication facility such as Internet, a telephone communication facility transmit emergency communication through the use of a telephone or a mail, or serves as an emergency communication outgoing source if TV, a radio, a satellite, a spot broadcast station or individual sends emergency communication through the use of the telephone or mail. The unmanned TV, personal computer and like of these are assumed to be able to perform a remote control operation through the use of a communication line. Thus, the cellular phone 1 is able to communicate with the emergency communication outgoing source 5 connected to Internet through the base station 3 and the telephone network control center 4.

Now consider where in this case, emergency communication indicative of both the fact that something is wrong with the emergency communication outgoing source 5 and an emergency situation has occurred, and its outline is transmitted to the cellular phone 1 corresponding to the user. The telephone network control center 4 sends the emergency communication to the cellular phone 1 through the base station 3. Since the cellular phone 1 is in communication with the cellular phone 2 in this case, the emergency communication cannot be notified to the user even if it is received because voice communications take precedence over data communication in the conventional cellular phone. Thus, in the present embodiment, when emergency communication is received even if a call is in progress, a user is notified of its contents by means of the sound, light or vibrations and the outline of the emergency communication is displayed on the corresponding display device, whereby the user is able to recognize the reception of the emergency communication even if a call is in progress. The user is also able to select whether "the present call is set on-hook" or "the call is set on-hold", establish communication with the emergency communication outgoing source 5 and display further detailed information.

Thus, even if the user is on the phone where the emergency communication outgoing source has detected a malfunction and transmitted the emergency communication to the user, the user is capable of receiving the emergency data communication and coping with the contents of the emergency data communication in real time.

The contents of the present embodiment will hereinafter be described in detail. The configurations of the cellular phones, base station and emergency communication outgoing source according to the present embodiment will hereinafter be explained using FIGS. 1 through 4.

Figure 2:
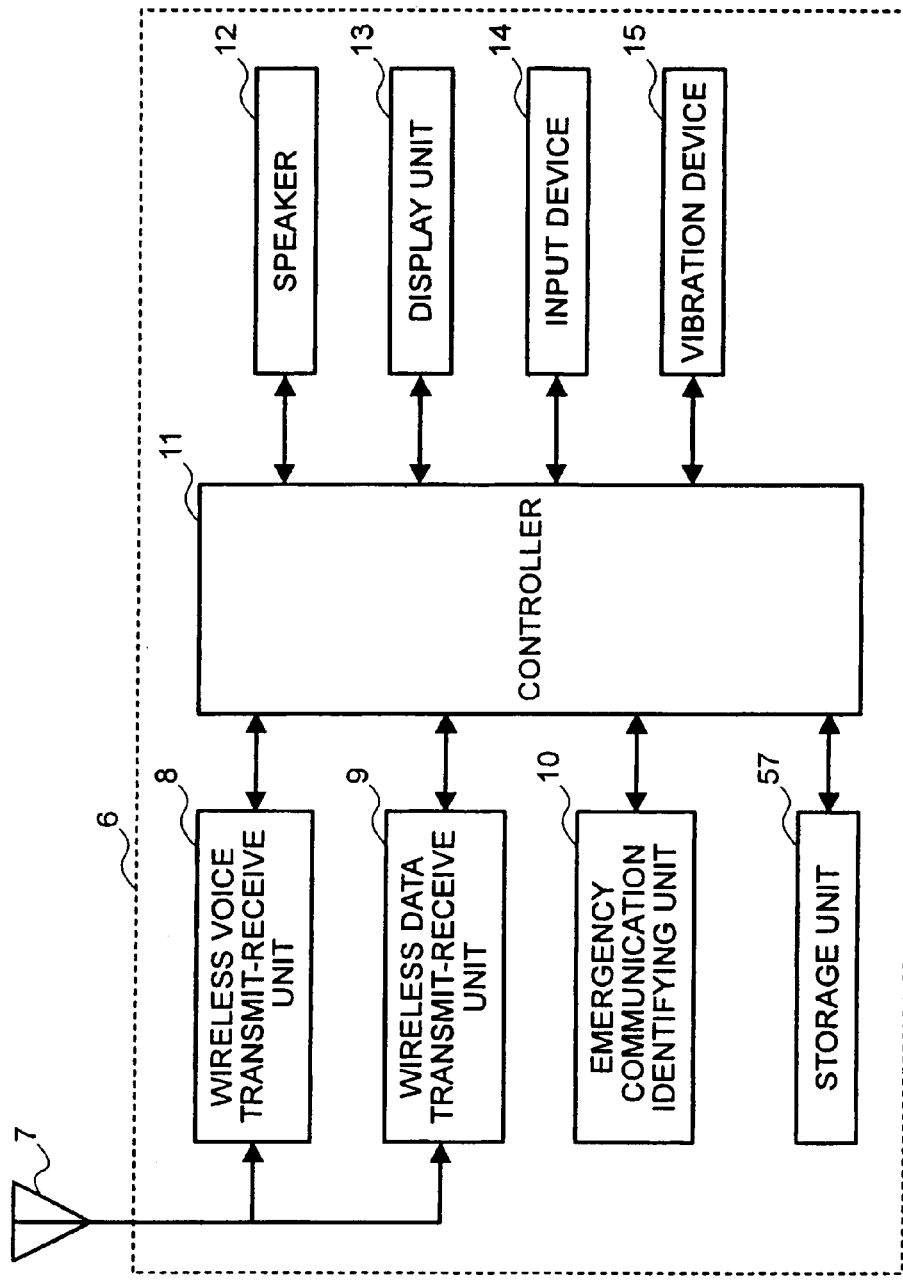
FIG. 2 is a diagram illustrating a configuration of a cellular phone according to a first embodiment.

The configuration of the cellular phone 1 will first be described using FIG. 2. FIG. 2 is a diagram showing a block diagram of the cellular phone. The cellular phone 6 includes a wireless voice transmit-receive unit 8, a wireless data transmit-receive unit 9, an emergency communication identifying unit 10, a controller 11, a speaker 12, a display unit 13, an input device 14 and a vibration device 15. The wireless voice transmit-receive unit 8 performs transmission and reception of an audio signal to and from a base station 16 via a network. The wireless data transmit-receive unit 9 performs transmission and reception of a data signal to and from the base station 16 through the network. The emergency communication identifying unit 10 detects and identifies whether emergency communication is included in received information. The controller 11 controls the wireless voice transmit-receive unit 8, the wireless data transmit-receive unit 9, the emergency communication identifying unit 10, the speaker 12, the display unit 13, the input device 14 and the vibration device 15. The speaker 12 makes an alarm sound loud when a call/communication is received or emergency communication is received, thereby notifying it to a user. The display unit 13 is a liquid crystal screen or the like and is capable of displaying the contents of the received emergency communication. The input device 14 is a key input unit or the like and is capable of inputting commands or the like by the user. When the arrival of a call/communication is made or emergency communication is received, the vibration device 15 notifies it to the user by vibrations. A storage unit 57 stores data such as mails, web, telephone directory, picture, music, and programs such as predetermined software.

Figure 16:
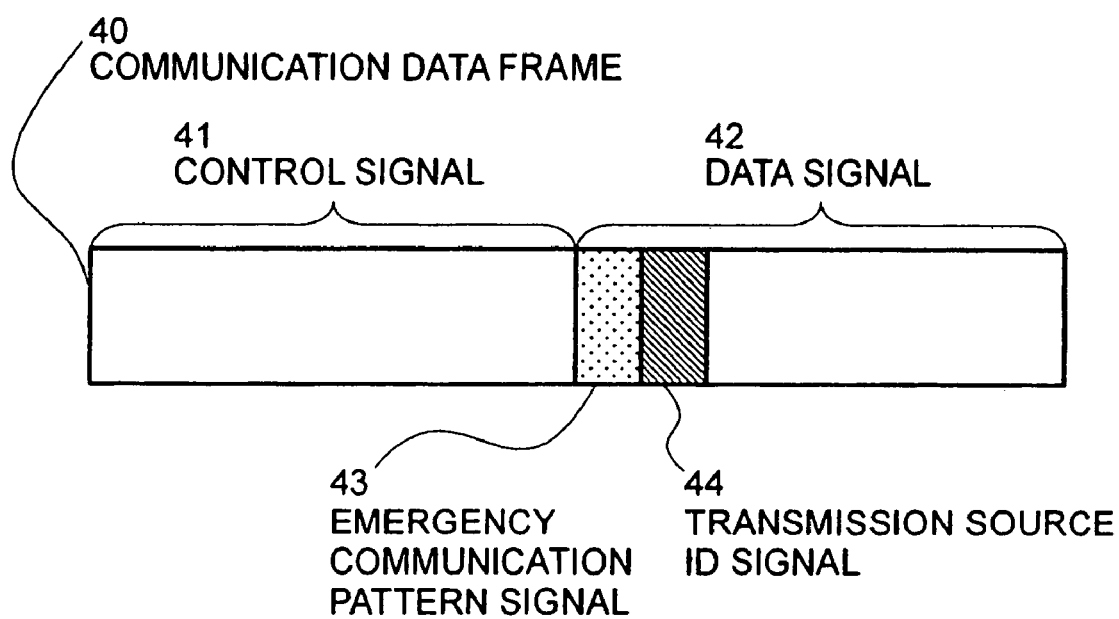
FIG. 16 is a diagram illustrating a configuration of a received communication data frame.

The details of the emergency communication identifying unit 10 will now be explained using FIGS. 16 and 17. FIG. 16 is a diagram showing a configuration of a communication data frame, and FIG. 17 is a diagram illustrating a configuration of the emergency communication identifying unit, respectively.

As shown in FIG. 16, a control signal 41 and a data signal 42 are contained in a communication data frame 40 used as emergency information. The control signal 41 contains destination information (telephone number, E-MAIL addresses and information on other destinations) indicative of a specific communication terminal equipment (not shown). The data signal 42 includes an emergency communication pattern signal 43 and a transmission source ID signal 44 intended for the communication terminal equipment indicated by the destination information. That is, since the specific contents of the emergency information are contained in the data signal 42, communication terminal equipments other than the communication terminal equipment indicated by the destination information need not to identify an emergency communication pattern. If the emergency information is embedded in the control signal 41 as in the related art, it is then discriminated whether an indefinite number of cellular phones are intended for emergency communication, and the emergency communication is received. Therefore, the emergency information cannot be sent to a specific destination but such a problem does not occur in the present embodiment.

Figure 17:
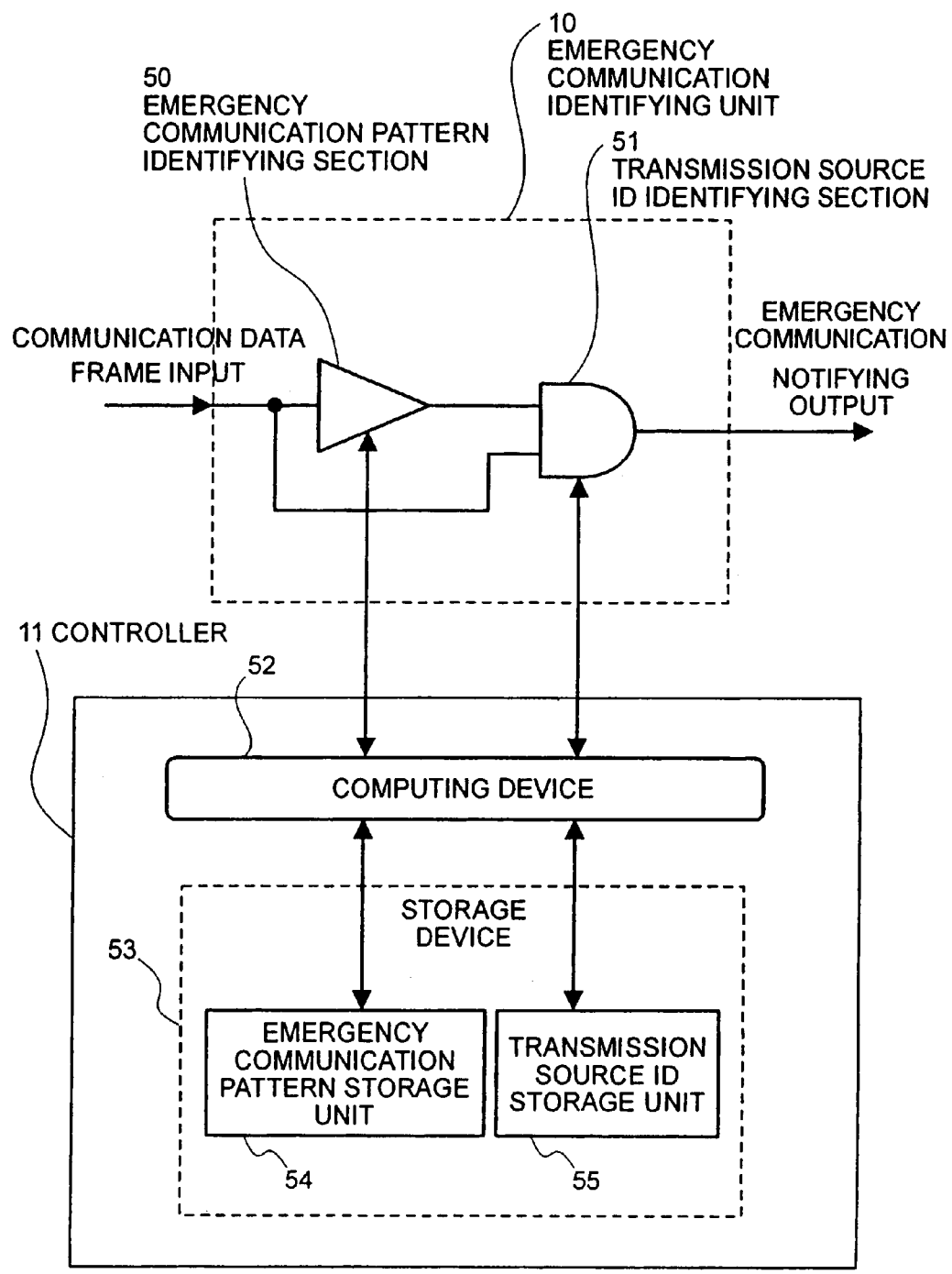
FIG. 17 is a diagram showing the details of the emergency communication identifying unit.

As shown in FIG. 17, the emergency communication identifying unit 10 comprises an emergency communication pattern identifying section 50 and a transmission or outgoing source ID identifying section 51. The emergency communication identifying unit 10 receives the emergency communication pattern signal 43 included in the data signal 42 of the communication data frame 40 to determine whether transmitted data indicates emergency communication, and checks the emergency communication pattern signal 43 against the contents of an emergency communication pattern table retained in an emergency communication pattern storage unit 54 lying inside a storage device 53 through a computing device 52 to determine whether the pattern thereof corresponds to an emergency communication pattern. When data coincident with the result of check is found, the transmission source ID identifying section 51 determines whether or not a transmitted communication data frame corresponds to communication data sent from an illegal device or the like. For the purpose of its determination, the transmission source ID identifying section 51 refers to a transmission source ID table retained in a transmission source ID storage unit 55 lying inside the storage device 53 through the computing device 52 and checks it against the transmission source ID signal 44 contained in the data signal 42 of the received communication data frame to thereby check whether or not the outgoing or transmission source is of an illegal device. The transmission source ID identifying section 51 judges only the checked data as the right emergency communication and notifies the contents of the emergency communication. A telephone network communication unit 21 communicates with the telephone network control center 4 through a telephone network web 22. That is, it is assumed that the emergency communication identifying unit 10 has an emergency communication pattern table which identifies to which form the emergency communication corresponds, and an emergency communication ID table which identifies from which emergency communication outgoing source the emergency communication is received, according to emergency communication forms. Since an emergency communication pattern and data of an emergency communication outgoing source are contained in the received emergency communication data as shown in FIG. 10, the emergency communication identifying unit 10 is able to determine to what type of emergency communication the emergency communication corresponds or from what type of device the emergency communication is sent, by referring to an emergency communication pattern table shown in FIG. 11 and emergency communication ID tables (user-registered device ID tables) shown in FIGS. 12 through 15. If the emergency communication pattern is "100100100", for example, then the emergency communication identifying unit 10 is capable of determining the emergency communication as emergency communication from a device registered by a user. If the emergency communication ID is of "TV107839", then the emergency communication identifying unit 10 can determine it as emergency communication from TV (A-TV). If the emergency communication ID is of "FIRE425896", then the emergency communication identifying unit 10 can determine it as emergency communication from a fire alarm (D-FIRE). If the emergency communication pattern is of "111100100", then the emergency communication identifying unit 10 can judge it as emergency communication from an emergent IP phone. If the emergency communication ID is of "FED-CBA98765", then the emergency communication identifying unit 10 can determine it as emergency communication from an IP phone "A".

The cellular phone is capable of grasping the emergency information outgoing source by containing these emergency communication IDs in the emergency information, and hence communication with the emergency information outgoing source can be established. Since such information are not contained in the emergency information and only unidirectional communication is allowed in the related art, interactive communication cannot be established. In the present embodiment, however, such a problem does not occur.

Incidentally, these emergency communication IDs can be registered by inputting IDs that respective corresponding devices have, to their corresponding cellular phones by users themselves or transferring IDs from respective corresponding devices to their corresponding cellular phones by wire or wireless. Although the emergency communication identifying unit has been described as a block aside from the controller 11 in the present embodiment, it may be configured as a block lying inside the controller 11. Although it has also been described as hardware in the present embodiment, it may be configured as software. When it is configured as software, it is stored in, for example, a memory lying inside the controller 11 or the storage unit 57. Further, the emergency communication pattern storage unit 54 and the transmission source ID storage unit 55 may be configured inside the storage unit 57.

Since the above configuration enables identification of emergency communication to be received, no illegal emergency communication is received, thereby making it possible to perform communications in which security has been ensured. Even if the emergency communication pattern is changed if the pattern table is set to such a configuration as to be updatable by individual or an encrypted communication line, then the pattern table can be also changed in accordance with it, thereby making it possible to prevent the phenomenon that the emergency communication cannot be received. Further, since communications can be established in a one-to-one correspondence, the emergency communication outgoing source can also be remote-controlled. When the emergency situation has occurred, adaptation to it can be performed immediately. Since the emergency communication identifying pattern is not contained in control data, there is no addition of data necessary for the emergency communication for other users.

Figure 3:
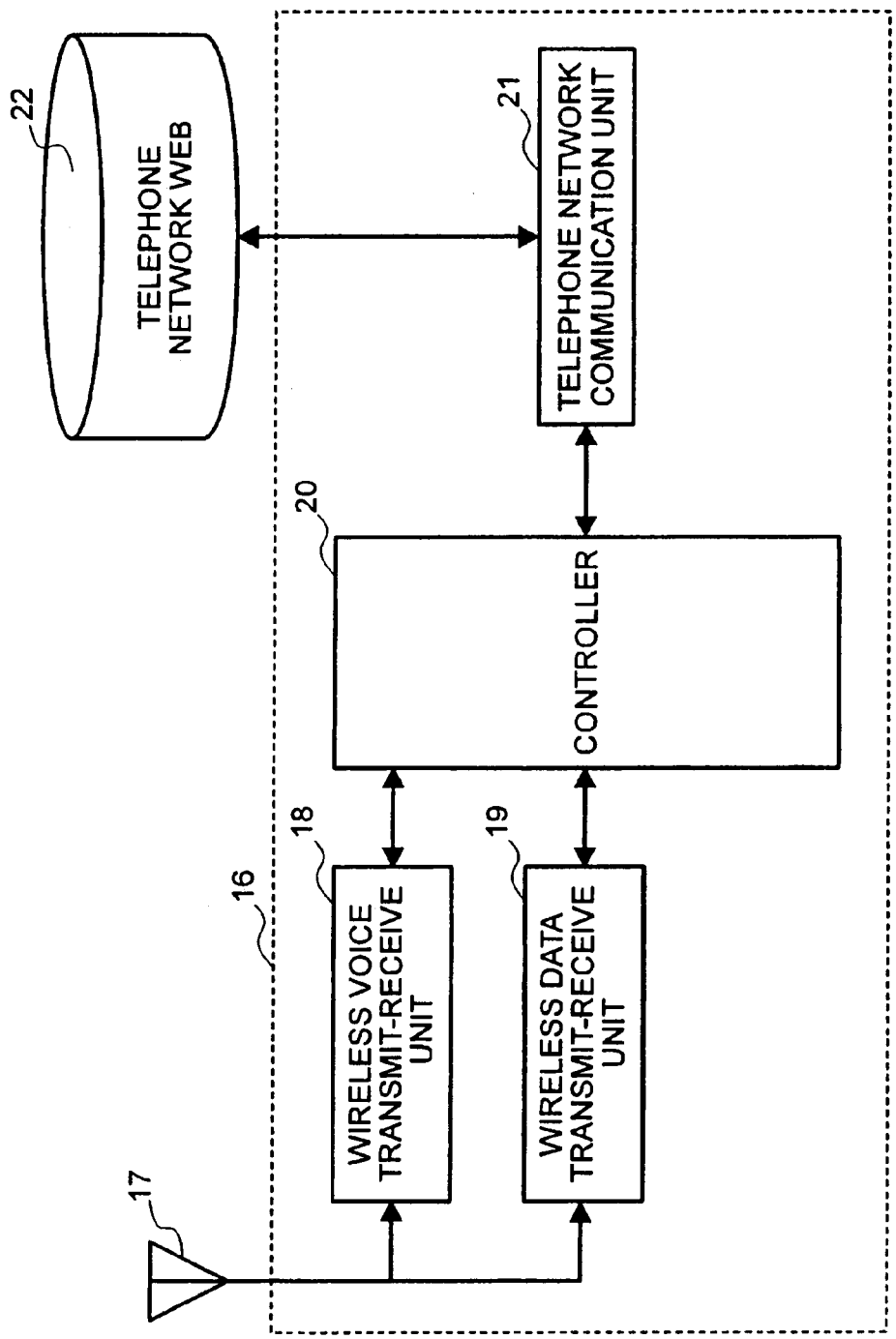
FIG. 3 is a diagram depicting a configuration of a base station system according to the first embodiment.

The configuration of the base station 3 will next be described using FIG. 3. FIG. 3 is a view showing a system diagram of the base station. The base station 16 includes a wireless voice transmit-receive unit 18, a wireless data transmit-receive unit 19, a controller 20, a telephone network communication unit 21 and a telephone network web 22. The wireless voice transmit-receive unit 18 performs transmission and reception of an audio signal to and from the cellular phone 6 via a network. The wireless data transmit-receive unit 19 performs transmission and reception of a data signal to and from the cellular phone 6 via the network. The controller 20 controls the wireless voice transmit-receive unit 18, the wireless data transmit-receive unit 19, and the telephone network communication unit 21. The telephone network communication unit 21 communicates with the telephone network control center 4 through the telephone network web 22.

Figure 4:
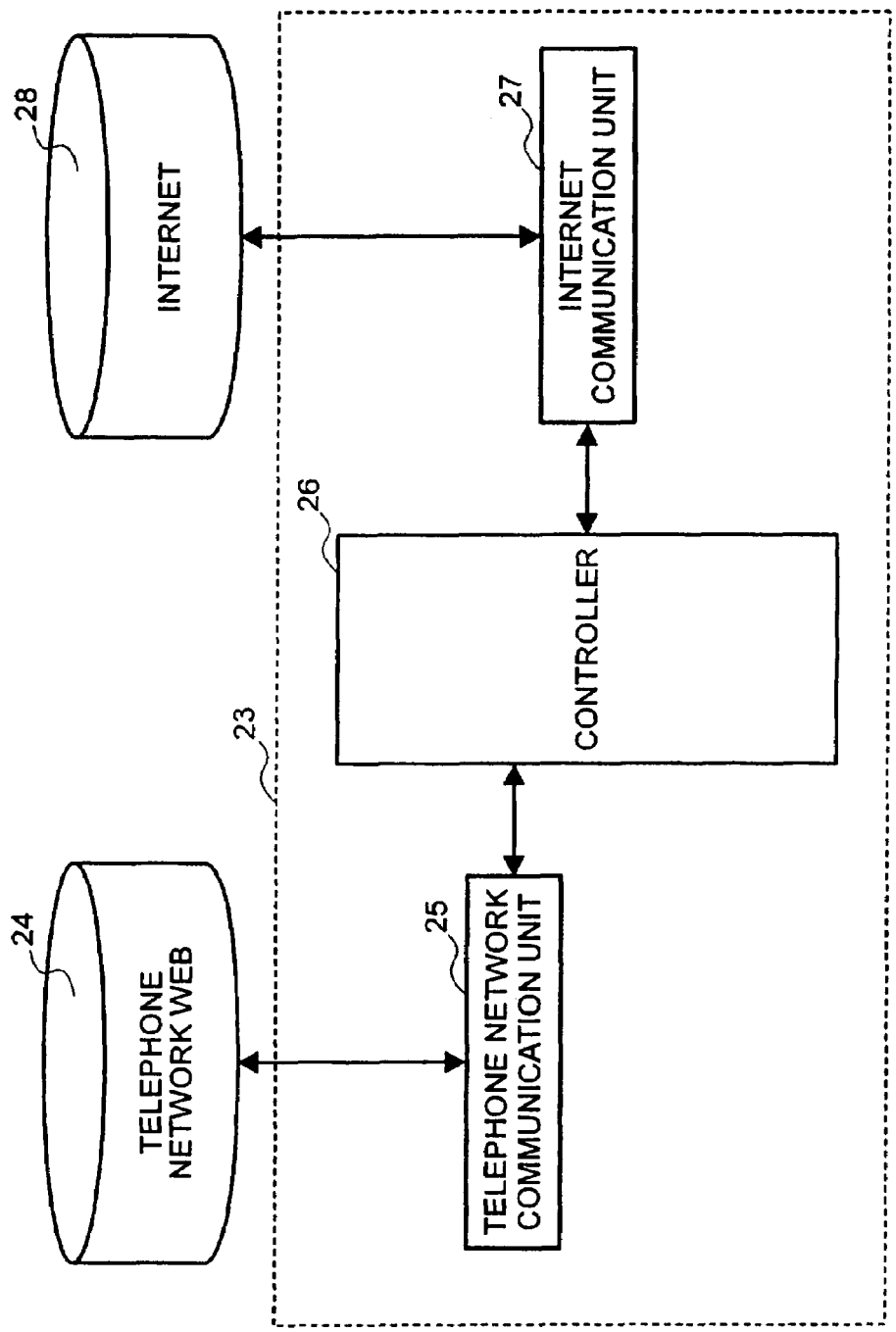
FIG. 4 is a diagram showing a configuration of a telephone network control center according to the first embodiment.

A configuration of the telephone network control center 4 will next be described using FIG. 4. FIG. 4 is a diagram showing the configuration of the telephone network control center. The telephone network control center 4 communicates with the emergency communication outgoing source 5, using an Internet communication unit 27 through Internet or wireless data communications. When emergency communication is sent out from the emergency communication outgoing source, the telephone network control center 4 transmits urgent or emergency data communication to the base station 3 through the use of a telephone network communication unit 25. The base station 3 having received the emergency data communication sends the emergency data communication to the cellular phone 1. The controller 26 controls the telephone network communication unit 25 and the Internet communication unit 27.

The emergency communication outgoing source 5 will next be explained. When an emergency situation occurs, the emergency communication outgoing source 5 transmits emergency communication to a user's cellular phone. When a reply is made from the user and a request to connection of an emergency communication link is made, the emergency communication link is connected to enable remote control from the user's cellular phone. Even when the information apparatus or the like has sensed an emergency situation at a location free of the presence of users if such a configuration is taken, it can adapt to it immediately.

Figure 8:
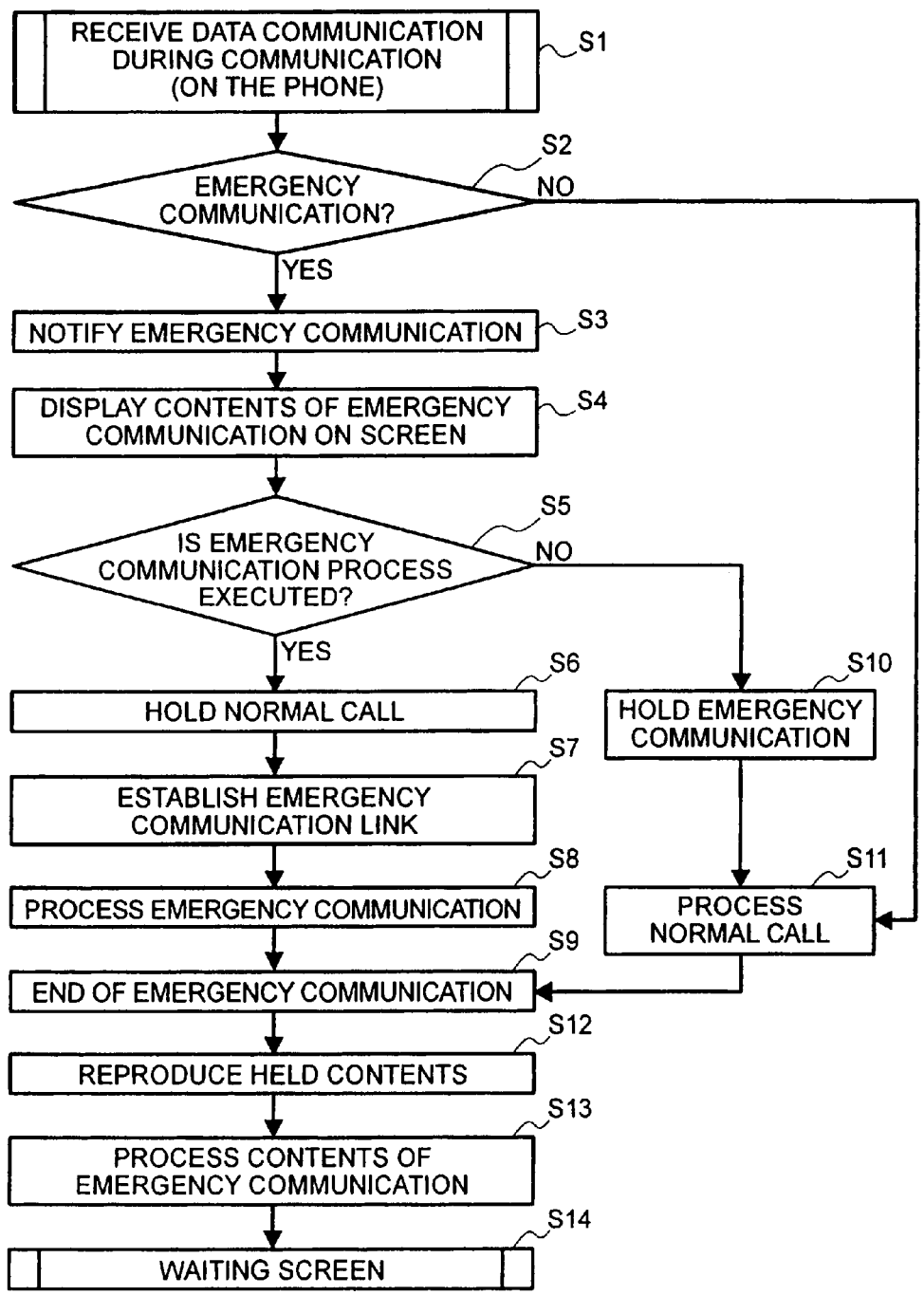
FIG. 8 is a diagram showing operations according to the first embodiment.

A process from execution of processing on emergency communication when data communication corresponding to the emergency communication is received while a call is in progress, to the returning to a waiting screen after completion of processing on a call made on hold during the emergency communication will next be explained using FIG. 8.

Figure 9:
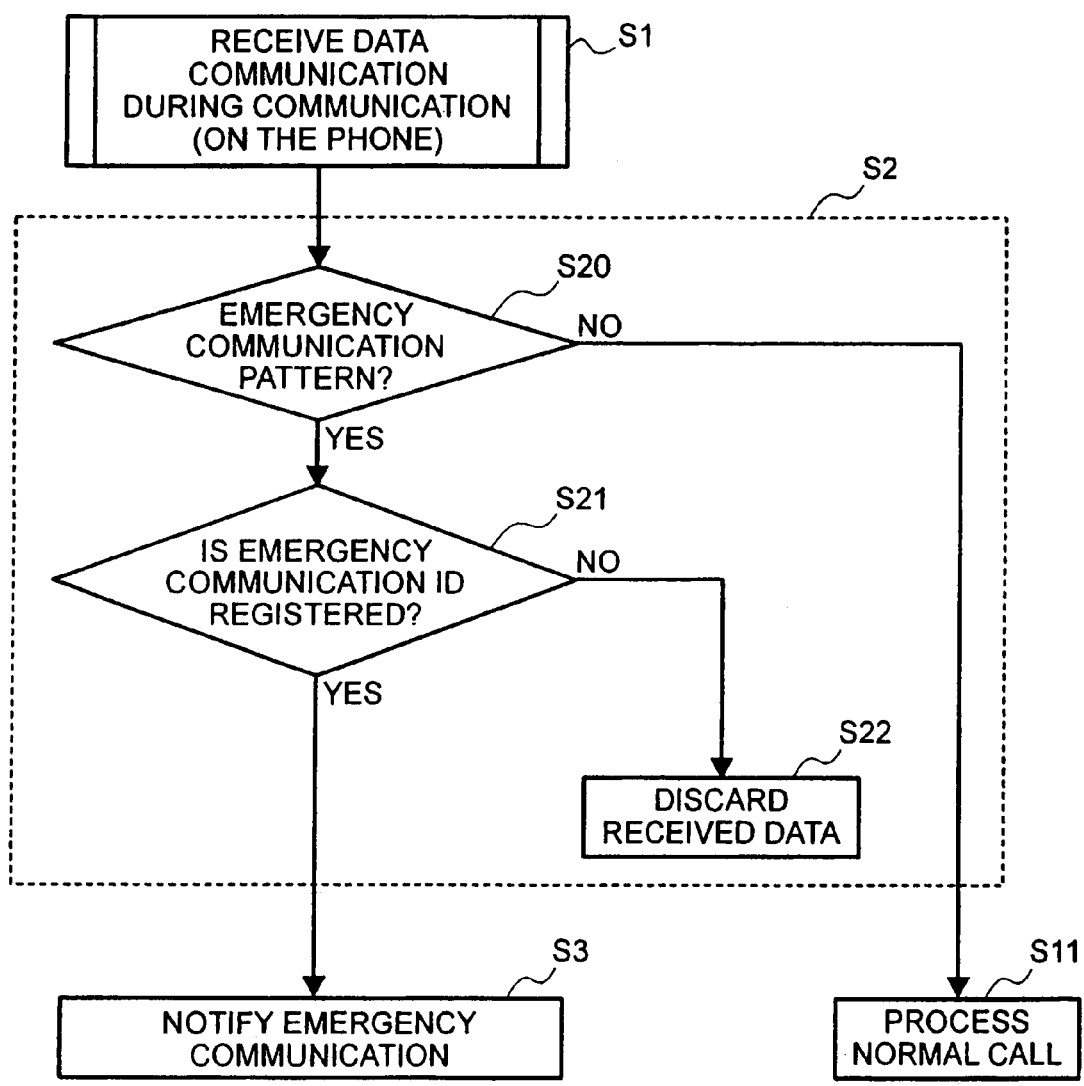
FIG. 9 is a diagram illustrating a detailed operation for determination at the time of arrival of emergency communication.

(1) When a user receives data communication while its call is in progress (S1), the user first determines whether the data communication corresponds to emergency communication (S2). The determination at Step S2 will be explained in detail using FIG. 9. When the user receives data communication while its call is in progress, it is first identified whether the received data corresponds to emergency communication (S20). Described specifically, the received data is transmitted from the wireless data transmit-receive unit to the emergency communication identifying unit through the controller. The emergency communication identifying unit compares the emergency communication pattern of the received data and the emergency communication pattern table. When the transmitted emergency communication pattern is found to exist in the table, the emergency communication identifying unit judges it as the emergency communication pattern and proceeds to a process for emergency communication ID collation. If the emergency communication pattern is 100100100, for example, then the emergency communication pattern can be judged to be an emergency communication pattern from a user-registered device from the emergency communication pattern table shown in FIG. 11. The emergency communication outgoing source can also be specified. On the other hand, when the emergency communication identifying unit judged the received emergency communication pattern not to be the emergency communication, the emergency communication identifying unit proceeds to S11. The emergency communication identifying unit checks the transmitted emergency communication pattern against the emergency communication pattern on the user side in the case of the contents of emergency communication shown in FIG. 10, for example. When the transmitted pattern is of 100100101, and is compared with the emergency communication pattern table shown in FIG. 11, and the transmitted emergency communication pattern is not found, the emergency communication identifying unit judges the received data communication not to be emergency communication.

If it is judged that the received emergency communication pattern has been found in the emergency communication pattern table, then the emergency communication identifying unit retrieves whether the emergency communication outgoing source ID of the received emergency communication is being registered in an ID table corresponding to the type of the emergency communication pattern, in order to determine whether the illegal emergency communication exists (S21).

If the emergency communication outgoing source ID could be detected from within the corresponding ID table, then the emergency communication identifying unit notifies a user that the emergency communication has been received. Now consider where, for example, the emergency communication pattern is set identical to the user-registered device and the emergency communication outgoing source ID is of TV107839. This ID can be judged to be emergency communication from A-TV from FIG. 12, and the emergency communication identifying unit proceeds to a process for notifying the user that the emergency communication has been received. Even when data is externally transmitted under cover of emergency communication if such a configuration is taken, it is judged whether the transmitted emergency communication corresponds to the emergency communication from the emergency communication outgoing source registered by the user, thereby making it possible to properly receive the emergency communication.

On the other hand, if the emergency communication outgoing source ID could not be detected from within the corresponding ID table, then the present urgent data is judged to be illegal information and the received data is discarded (S22).

(2) When the received data communication is judged to be emergency communication, any of a sound, light, vibrations and the like or a plurality of means are used to urge a user to see the screen in order to notify the user being on the phone that the emergency communication has been received (S3). Thus, even when the user concentrates on his or her call, it is possible to more reliably notify the user that the emergency communication has been received. By notifying the user of it by means of a sound (voice), light or vibration pattern which varies for each emergency communication outgoing source, the user is able to judge whether the emergency communication corresponds to some kind of emergency communication.

Figure 5:
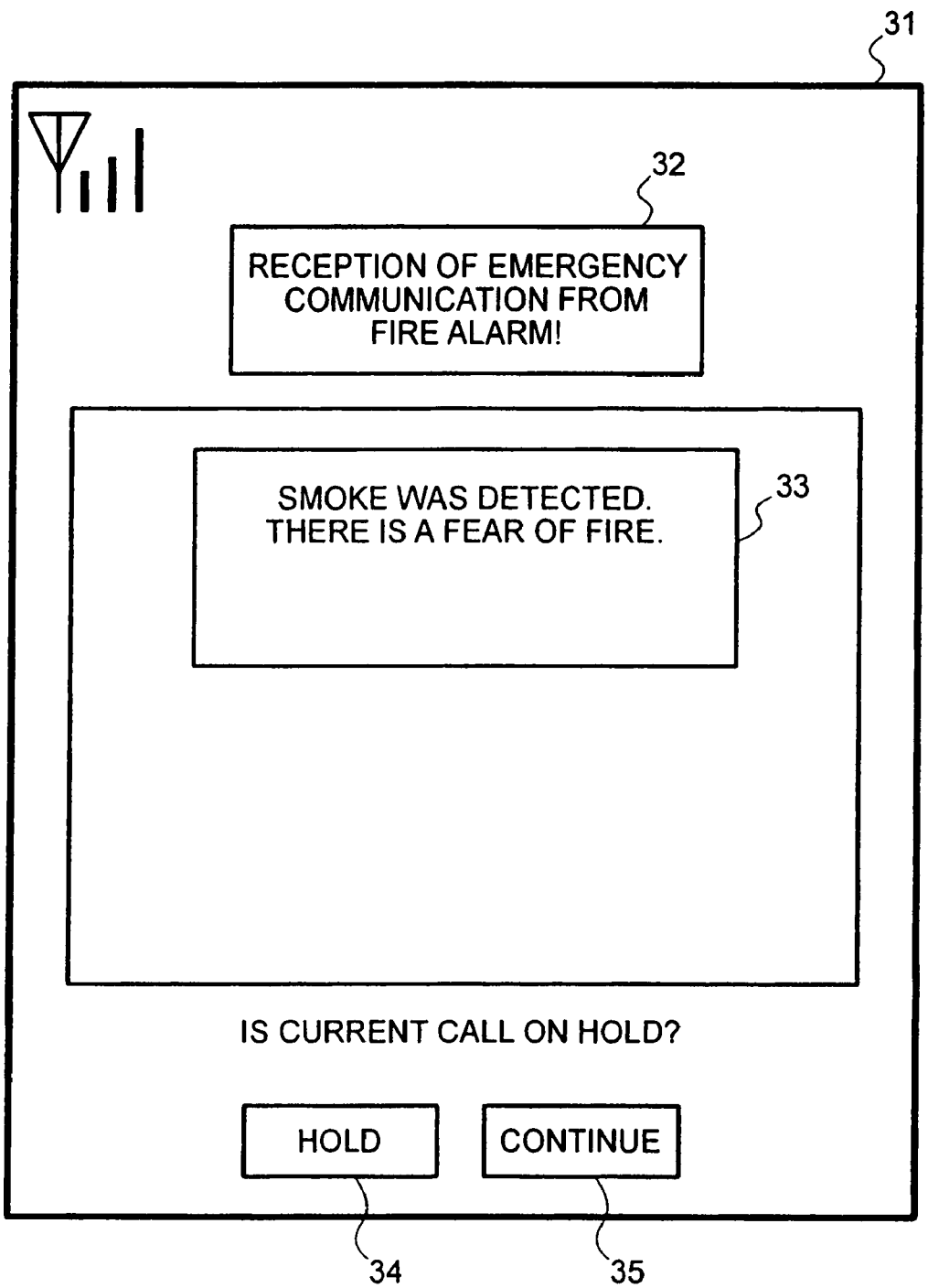
FIG. 5 is a diagram illustrating a screen on which emergency communication has been received while a call is in progress.

After the user is informed of the reception of the emergency communication, the contents of the emergency communication are displayed on the screen (S4), and it is determined whether an emergency communication process should be executed. The displayed screen of contents of emergency communication is illustrated as such a display as shown in FIG. 5, for example. FIG. 5 shows a case in which the emergency communication outgoing source is a fire alarm. The emergency communication outgoing source is designated at numeral 32. Displaying the emergency communication outgoing source on the screen in this way makes it possible to grasp which communications equipment sends out the emergency communication.

(3) When the emergency communication is displayed on the screen, the user being on the phone holds the present call while confirming the screen on which the contents of the emergency communication is being displayed, and determines whether the process should proceed to the emergency communication process (S5). During this period, the present call is brought to an intermitted state. Described specifically, the called party is notified of reception of the emergency communication and a wait for its processing, or placed in a state in which awaiting music is running.

Figure 6:
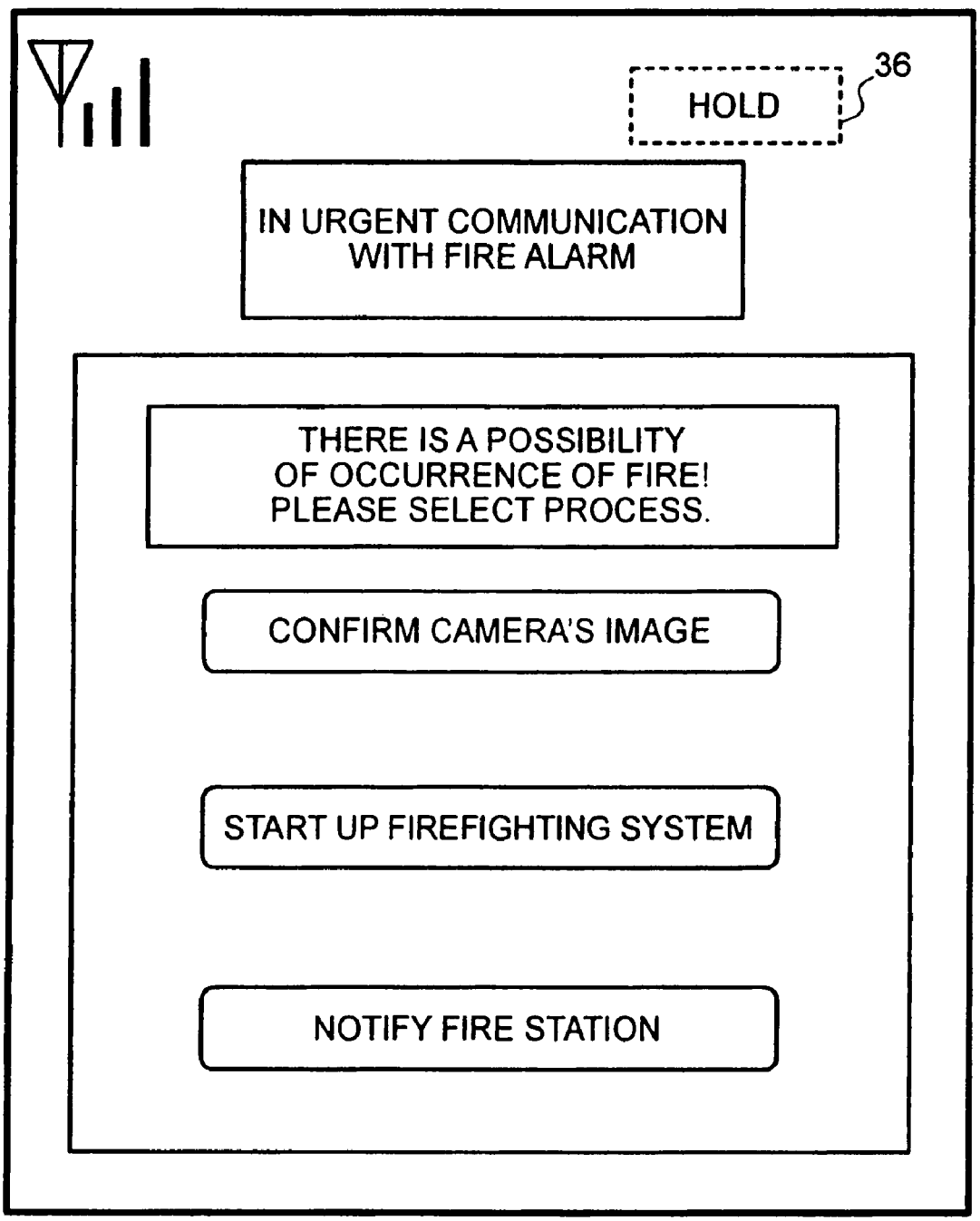
FIG. 6 is a diagram showing a screen placed under emergency communication at the time that a normal call is on hold.

When it is judged that the emergency communication process should be executed, the present call is held (S6) and the emergency communication outgoing source and the emergency communication link are established. By selecting "Hold" in the screen of FIG. 5, for example, the execution of the emergency communication process is judged, and hence the present call is held and the procedure proceeds to the process of establishing the emergency communication link. When the user confirms the screen and judges that the emergency communication process is executed, the present call (normal call) is held and an icon of "Hold" is displayed within the screen. A specific screen is represented as shown in FIG. 6. In the screen, the icon of "Hold" is displayed in the upper right portion of the screen. Although the call is broken off when held, information of a called party and the date of its holding are stored in the corresponding buffer as the hold call at the emergency communication. If such a configuration is taken, then the user is able to resume talking to the called party placed on hold right now on the basis of the information stored in the buffer even when the emergency communication is finished. If information for notifying the user that the call has been on hold is transmitted, then the called party having received it is caused to select either the end of communication or leaving of a caller message. When the called party selects that the caller message is left, the called party may record the contents of the caller message in an answering machine center or a memory lying in a cellular phone. Since the contents undelivered by the called party can be left as a caller message if such a configuration is taken, there is no need to make a call anew. The user can recognize at a glance that the communication is on hold because the icon of "Hold" is displayed within the screen.

After the present call is placed on hold, the emergency communication link is established (S7). When it is judged that the emergency communication process is executed, a cellular phone of a user having received the emergency communication transmits its contents to its corresponding emergency communication outgoing source with ID of the user's cellular phone attached thereto, and is brought to a state of a wait for establishment of the emergency communication link. When this reply information is regarded as ACK, the corresponding emergency communication outgoing source having received ACK establishes an emergency communication link. With the transmission of its contents with ID of the user's cellular phone attached thereto, the emergency communication outgoing source checks an emergency communication outgoing destination ID against ID attached to the received ACK. Receiving only the coincident data enables prevention of illegal control on the emergency communication outgoing source. When the emergency communication link is established, the emergency communication process is executed (S8). During a period in which the emergency communication process is in execution, a process for other communication is placed in a hold state as a communication link having precedence over the normal call or data communication. When, however, emergency communication is inputted during the establishment of the emergency communication link, the processing procedure returns to the process of S1, where the contents of the emergency communication are displayed. If such a configuration is provided, it is then possible to avoid a hindrance to the execution of processing by other communication in the act of coping with an emergency situation and to immediately adapt to the emergency situation.

When the emergency communication outgoing source is of a fire alarm as shown in FIG. 6, for example, "Confrontation of camera's image", "Startup of firefighting system" and "Notify fire station" can be selected. By establishing the communication link and selecting these processes, and allowing the user to perform remote control, prompt adaptation to the emergency situation is enabled.

When the emergency communication process is completed, the emergency communication link is broken off and other communication is also placed in an accepting state (S9).

On the other hand, when the user judges in Step S5 that no emergency communication process is executed, the user holds the received emergency communication and continues the present call. When the user selects "continue" in the screen shown in FIG. 5, for example, the user judges that the emergency communication process is not executed, and holds the received emergency communication. If such a configuration is taken, then the user is able to select whether the present call should be a high priority or the emergency communication should be a high priority while confirming the screen.

Figure 7:
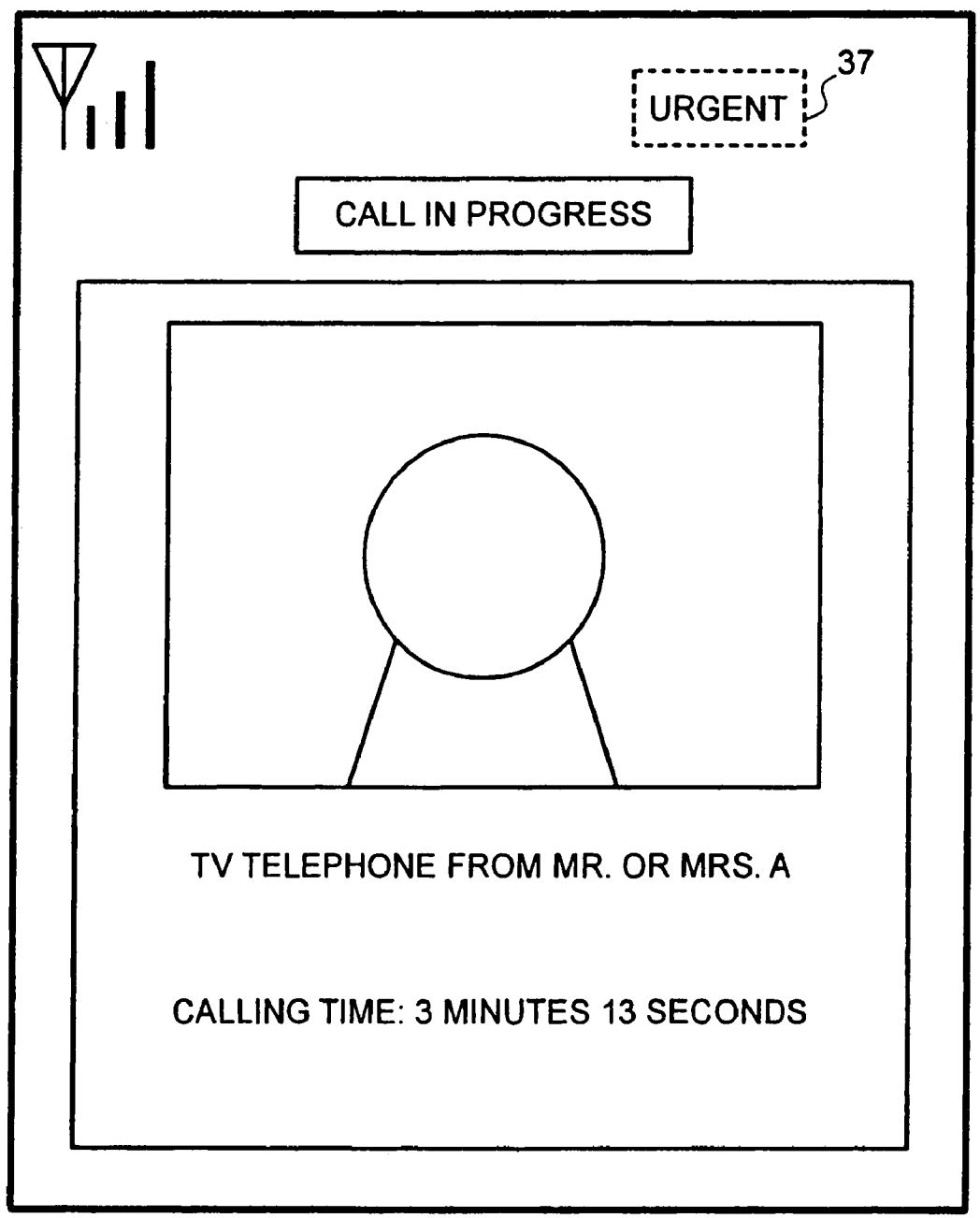
FIG. 7 is a diagram depicting a screen placed under a normal call in progress at the time that emergency communication is on hold.

When it is judged that no emergency communication process is executed, the received emergency communication is held and an icon for holding of the emergency communication is displayed within the screen (S10). A specific screen is represented as shown in FIG. 7, and an icon indicating that the emergency communication is on hold, is shown in the upper right portion of the screen. The example of FIG. 7 shows a case in which a call to Mr. or Mrs. A corresponding to a called party through a TV telephone continues. The example shows a state in which an icon 37 indicative of "Emergency" is displayed on the screen. The contents of the held emergency communication, information on the transmission of outgoing source and the date of its reception are stored in the corresponding buffer lying in the cellular phone. If such a configuration is taken, the user is able to execute the emergency communication of the called party placed on hold immediately on the basis of the information stored in the buffer even when the call is ended. If information for notifying the user that the call has been on hold is transmitted to the emergency communication outgoing source, then the emergency communication outgoing source having received that the emergency communication has been on hold, may be set so as to automatically execute processing at its hold. Even in case of an emergency situation, it can be handled to some degree if such a configuration is taken. Therefore, the incurrence of significant damage is less reduced because the emergency communication outgoing source is left as it is while the emergency situation remains in its transmitted state. The user can recognize at a glance that the communication is on hold because the icon of "Emergency communication is on Hold" is displayed within the screen.

After the emergency communication is placed on hold, the user continues the present call (S11). Even when the emergency communication is received during this period, the received emergency communication is handled from the process of S1 in a manner similar to S8.

When the normal process is finished, the present communication line is broken off and hence the communication is terminated (S9).

(4) When the communication is ended at the flow of S9, the contents placed on hold are reproduced or played back (S12). When the called party leaves the caller message at the flow of S6 here, the processing procedure proceeds to a process for reproducing the contents of the caller message. On the other hand, when the called party cuts off the communication, a call to the called party is automatically made on the basis of the communication source information stored in the buffer. When the emergency communication is placed on hold at the flow of S10, the user communicates with its corresponding emergency communication outgoing source to perform processing of the contents of the emergency communication.

When the communication source placed on hold and the communication link are established, the contents of the communication are processed (S13). When the emergency communication or the normal communication is inputted during this period, the present process is placed on hold and the process of S1 is executed. If the process of all communication contents is finished, then the communication link is cut off and the processing procedure returns to a waiting screen (S14).

Thus, according to the cellular phone according to the present embodiment, when the emergency communication and the normal communication are identified and the emergency communication is detected, the emergency communication can take precedence over the normal communication. Even if the cellular phone is in progress in particular, the user is notified that the emergency communication has been received. The user judges priority to the present call while confirming the contents of the emergency communication, and is able to process the communication.

Incidentally, since a call for emergency communication can take precedence over the normal call even if the normal call is inputted during the emergency communication, a process that requires emergency can also be handled immediately without being troubled by other communication. Even if the emergency communication is inputted during the emergency communication, the contents thereof are displayed on the screen. Therefore, it is possible to confirm which of the current emergency communication placed in communication and newly-received emergency communication will have urgency. The user is able to select the communication that must be handled immediately and carry out its processing.

When the emergency communication is received during communication, the contents that the user is placed under communication is held, and the held contents can be automatically played back after the reception of the emergency communication.

Incidentally, since the hold icon is displayed on the screen when the communication is held, misremembering of the fact that the communication is placed on hold is less reduced. If the hold icon indicates that the emergency communication is on hold, then the user can confirm at a glance even that the emergency communication is on hold. Therefore, the fact that the communication must be handled immediately can be notified to the user.

By notifying the called party that the user has received the emergency communication during communication, the called party is able to grasp why the communication is interrupted and select a process with respect to the current call.

The configuration of the present embodiment may be a configuration having a telephone function and a communication facility without adopting the configuration limited to the cellular phone. The emergency communication outgoing source is not limited either to a device or like having an emergency communication outgoing or originating function. When it is desired to receive emergency communications respectively transmitted by a radio broadcast, a TV broadcast, a satellite broadcast, P2P communication, Internet, etc., a device capable of receiving the respective communications is configured so as to be built in the cellular phone, thereby making it possible to receive various emergency communications even during communication and execute their emergency processing. When an emergency broadcast such as an earthquake, martial law, or the like is broadcasted through a TV station when a call is in progress through a cellular phone of FIG. 18 wherein a TV broadcast receiving unit is built in the cellular phone of FIG. 2, for example, such a table as shown in FIG. 13 is provided so that ID inherent in its broadcast can be identified, whereby the emergency broadcast is immediately notified to the user even while the call is in progress, and whether a TV image should be seen can be judged. A specific process at the input of an emergency broadcast while the call is in progress will be described using FIG. 8. When a TV broadcast is received using a TV broadcast receiving unit 56 during calling (S1), the received TV broadcast is inputted to the emergency communication identifying unit 10, where the emergency communication pattern table shown in FIG. 11 and data contained in the received broadcast are compared. When the pattern coincides with the emergency broadcast, the TV broadcast is judged to be an emergency broadcast and the emergency communication identifying unit 10 proceeds to the process of S21 (S20). Next, it is judged whether an emergency communication ID is contained in the received TV broadcast, and the data contained in the received broadcast and each of IDs in the table shown in FIG. 13 are checked against each other to thereby determine whether the emergency communication outgoing source corresponds to an illegal emergency communication outgoing source (S21). It is determined that when the corresponding ID exists in the table shown in FIG. 13, the communication does not correspond to illegal communication, and the emergency communication identifying unit 10 proceeds to the flow of S3. When the IDs do not coincide with each other, the received data is discarded (S22). Its subsequent process is performed in a manner similar to the case of data communication.

Figure 18:
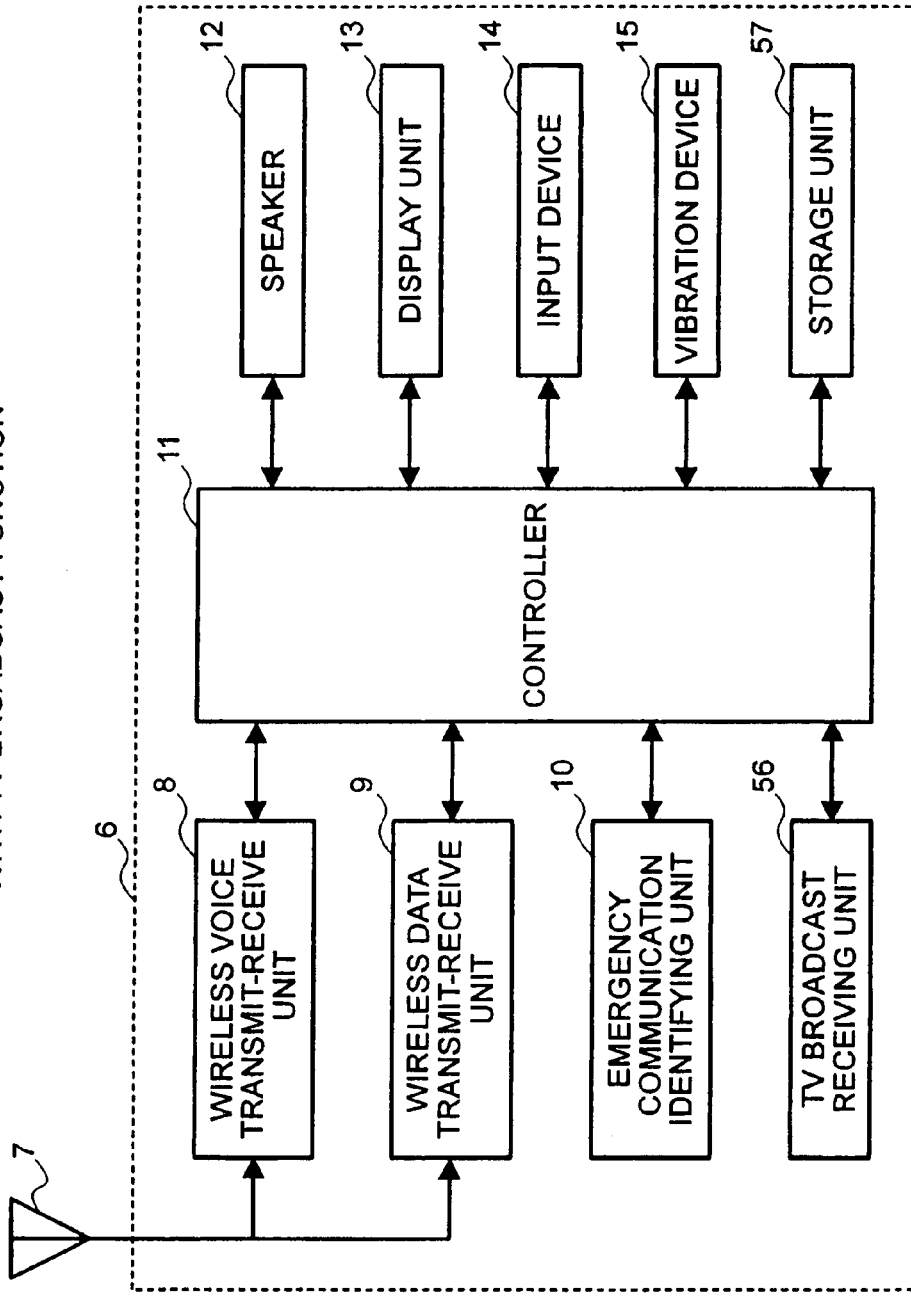
FIG. 18 is a diagram depicting a configuration of a cellular phone according to a second embodiment.

A process of the cellular phone shown in FIG. 18 at the time emergency data communication is inputted during TV broadcast viewing, will be described using FIG. 8. Now consider where the wireless data transmit-receive unit 9 receives data communication through the use of the TV broadcast receiving unit 56 during TV broadcast viewing at the flow of S1. The emergency communication identifying unit 10 checks whether an emergency communication pattern exists within the received data frame in the received data communication (S20). When the emergency communication outgoing source also coincides with the corresponding table, the emergency communication identifying unit 10 proceeds to S3 (S21). When the patterns do not coincide with each other, the emergency communication identifying unit 10 proceeds to the process of S11, and its subsequent process is carried out in a manner similar to the case where the data communication is received while the call is in progress. By executing such processing, the emergency data communication can be received even while a TV broadcast is being received. Also the above configuration is applicable not only to the cellular phone but also to communication terminal equipment-such as PDA.

Although the emergency communication ID according to the present embodiment may adopt a telephone number, an IP address or the like, the corresponding emergency communication outgoing source can be specified in a break with communication forms by allocating IDs.

The present embodiment is not limited to only the arrival or incoming call of emergency data communication while a call is in progress, and has the characteristic that since it is identified whether the communication corresponds to emergency communication for each received packet, the incoming call of the emergency data communication is enabled even during data communication.

By setting in advance a device registered by a user and a cellular phone that receives emergency communication, an emergency communication pattern signal and a transmission source ID signal lying in a received communication data frame can be contained within a data signal. With its configuration, an emergency communication signal delivered to a designated cellular phone from a specific device can be received without delay. Thereafter, an emergency communication outgoing source and a communication link are established to control a remote-controlled device, thereby making it possible to immediately cope with an emergency situation. Since the emergency communication pattern signal is contained in control data, emergency communication patterns directed from a base station for a cellular phone to a plurality of cellular phones placed in a specific area may be inputted to an emergency communication pattern signal section lying in the control data. Adopting a configuration free of insertion of the emergency communication pattern into each of parts subjected to various restraints, such as the interior of the control data eliminates the need for checking against an outgoing or transmission source ID of emergency communication bearing no relation to oneself and leads even to the effective use of a communication band. When emergency communication is transmitted from the base station to a cellular phone lying in a specific area, an emergency communication pattern may be placed in control data. Alternatively, the emergency communication pattern is registered and the base station is registered in the corresponding emergency communication outgoing source, whereby emergency communication directed to one to majority can also be notified to users. By deleting an emergency communication pattern low in urgency in reverse, such a configuration as not to receive need-free emergency communication can also be taken.

Although the present embodiment has described the information received by the communication terminal equipment as the emergency information, the present embodiment does not necessarily require emergency. That is, the information should be received without delay even while a call is in progress, and in the case of information to be notified, it needs not to be configured as an emergency one. By performing such control that by reference to priorities included in received information, for example, information given a high priority is notified and information given a low priority is not notified, it is also possible to switch or select whether they should be notified with priorities without using urgency. All information received from an information apparatus are set so as to be notified, thereby making it also possible to establish communication with the information apparatus when some information is received from the information apparatus and to remote-control the information apparatus. Further, if a user is able to set whether or not these information should be notified, then control corresponding to user preferences can be performed.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

What is claimed:

1. A communication terminal comprising:
a transmitting/receiving module configured to transmit and receive communication signals including voice communication information and data communication information;
a pattern memory which stores a plurality of stored data patterns that correspond to various kinds of emergency information;
an ID memory configured to store a transmission source ID corresponding to the plurality of stored data patterns stored in the pattern memory;
a pattern identifier configured to determine whether a pattern that is contained in data communication information received by the transmitting/receiving module matches one of the plurality of stored data patterns stored in the pattern memory while the transmitting/receiving module is receiving voice communication information;
an ID identifier configured to determine whether a transmission source ID in the data communication information matches the transmission source ID in the ID memory corresponding to said one of the stored data patterns when the pattern in the data communication information matches said one of the stored data patterns and
a notification unit configured to selectively notify a user of a receipt of emergency information when the pattern contained in the data communication information matches said one of the stored data patterns and when the transmission source ID in the data communication information matches the transmission source ID stored in the ID memory corresponding to said one of the stored data patterns.

2. The communication terminal of claim 1 wherein the notification unit displays a message that requests the user to select whether an emergency communication process should be executed.

3. The communication terminal of claim 2 wherein the notification unit displays a plurality of options for emergency process when the user selects to execute the emergency communication process.

4. The communication terminal of claim 2 wherein the notification unit displays an icon indicating suspension of the emergency communication when the user selects not to execute the emergency communication process.

5. The communication terminal of claim 1 wherein the emergency information corresponding to the data pattern is judged to be inappropriate when the transmission source ID in the data communication information does not match the transmission source ID stored in the ID memory corresponding to the data pattern.

6. The communication terminal of claim 1 wherein the received data communication information is discarded when the transmission source ID in the data communication information does not correspond to the transmission source ID stored in the ID memory corresponding to the data pattern.

7. The communication terminal of claim 1 wherein the transmitting/receiving module transmits information indicating the receipt of emergency information to a called party of the voice communication.

8. The communication terminal of claim 2 wherein the transmitting/receiving module transmits information including an ID of the communication terminal to a transmission source of the data communication information.

* * * * *